US012718577B2

(12) United States Patent
Niemann et al.

(10) Patent No.: US 12,718,577 B2
(45) Date of Patent: Aug. 25, 2026

(54) METHOD FOR DETERMINING THE ROAD TEMPERATURE FROM INSIDE A MOTOR VEHICLE

(71) Applicant: HELLA GmbH & Co. KGaA, Lippstadt (DE)

(72) Inventors: Thomas Niemann, Delmenhorst (DE); Bastian Kanning, Bremen (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 514 days.

(21) Appl. No.: 17/177,642

(22) Filed: Feb. 17, 2021

(65) Prior Publication Data

US 2021/0253109 A1 Aug. 19, 2021

(30) Foreign Application Priority Data

Feb. 18, 2020 (DE) ........................ 102020104182.9

(51) Int. Cl.
*G06V 20/00* (2022.01)
*B60W 40/06* (2012.01)
(Continued)

(52) U.S. Cl.
CPC ............. *G06V 20/56* (2022.01); *B60W 40/06* (2013.01); *G06V 10/60* (2022.01);
(Continued)

(58) Field of Classification Search
CPC ............. B60W 40/06; B60W 2400/00; B60W 2420/40; B60W 2555/20; G06V 10/60; G06V 20/56
See application file for complete search history.

(56) References Cited

U.S. PATENT DOCUMENTS 6,166,657 A 12/2000 Mann
2006/0163458 A1* 7/2006 Reime .................... G06V 20/56 250/227.25
(Continued)

FOREIGN PATENT DOCUMENTS

DE 10062655 A1 7/2002
DE 102010055773 A1 6/2012
(Continued)

OTHER PUBLICATIONS

Lu Junhui and Wang Jianqiang, "Road surface condition detection based on road surface temperature and solar radiation," 2010 International Conference on Computer, Mechatronics, Control and Electronic Engineering, Changchun, 2010, pp. 4-7, doi: 10.1109/CMCE.2010.5610255. (Year: 2010).*
(Continued)

*Primary Examiner* — Anne Marie Antonucci
*Assistant Examiner* — Jordan T Smith
(74) *Attorney, Agent, or Firm* — MUNCY, GEISSLER, OLDS & LOWE, P.C.

(57) ABSTRACT

In a method for determining the surface temperature of a road on which a motor vehicle is travelling, the brightness of the ambient light around the motor vehicle is determined, that radiated light reflected from the road is captured, and that the measured values for brightness of the ambient light and the radiated light reflected from the road are included in the calculation. Also, a sensor arrangement for a motor vehicle for determining the surface temperature of a road on which the motor vehicle is travelling is used to carry out the method, in which at least one light sensor is assigned to the sensor arrangement for capturing the brightness of the ambient light around the motor vehicle, that at least one light sensor is assigned to the sensor arrangement for capturing
(Continued)

the radiated light reflected from the road on which the vehicle is travelling.

13 Claims, 1 Drawing Sheet

(51) Int. Cl.
*G06V 10/60* (2022.01)
*G06V 20/56* (2022.01)

(52) U.S. Cl.
CPC ..... *B60W 2400/00* (2013.01); *B60W 2420/40* (2013.01); *B60W 2555/20* (2020.02)

(56) References Cited

U.S. PATENT DOCUMENTS

2011/0234805 A1 9/2011 Matsuda et al.
2015/0166072 A1* 6/2015 Powers .................. G08G 1/015 701/1
2019/0217864 A1 7/2019 Kusukame et al.
2020/0074639 A1* 3/2020 Zhao ......................... G06T 7/90

FOREIGN PATENT DOCUMENTS

DE 102019217709 A1 * 5/2021
JP 2005306305 A * 11/2005
JP 2006343219 A * 12/2006

OTHER PUBLICATIONS

Machine Translation JP 2005306305 (Year: 2005).*
Machine Translation DE 10 2019 217709.*
Machine Translation of JP2006343219 (Year: 2006).*

* cited by examiner

METHOD FOR DETERMINING THE ROAD TEMPERATURE FROM INSIDE A MOTOR VEHICLE

BACKGROUND OF THE INVENTION

Field of the Invention

The invention relates to a method for determining the surface temperature of a road on which a vehicle is travelling. The invention further relates to a sensor apparatus for a vehicle for determining the surface temperature of a road on which a vehicle in travelling, in particular for performing the method according to the invention, wherein at least one light sensor is assigned to the sensor arrangement to capture the brightness of the ambient light around the vehicle.

Description of Related Art

In order to drive a motor vehicle in particular a motor vehicle safely, information about the condition of the road on which the vehicle is travelling is of great importance. In particular, the surface temperature of the road is one of the critical influencing factors that affects the force flow reserve between the tyres and the road. A warmer road surface affords a vehicle tyre more grip than a cold road surface. Moreover, in the event of road surface temperatures below the dewpoint, moisture can condense on the road surface and consequently be deposited on the road. Moisture films on the road can significantly reduce the effective static friction of the tyre on the road surface and thus impair various functions of the motor vehicle's driving dynamics. In this context, temperature fluctuations in the road surface temperature around freezing point are to be considered particularly critical, since it is here that there is a danger of black ice.

One of the difficulties encountered when determining the road surface temperature is that it is not sufficiently correlated with ambient temperature, since in certain special situations, e.g., between rows of buildings, or on or under bridges, these two temperature values can differ from each other substantially.

Consequently it is not possible to determine the road surface temperature with a simple measurement of the ambient temperature.

Fixed position measuring devices for determining the surface temperature of a road are known. However, these are only able to perform local measurements for a small number of road sections which are equipped with the measuring devices.

BRIEF SUMMARY OF THE INVENTION

The task underlying the invention consists in suggesting a method for determining the surface temperature of a road on which a motor vehicle is travelling, with which a determination of the road surface temperature is enabled without the having recourse to external sensor devices.

This task is solved with a method for determining the surface temperature of a road on which a motor vehicle is travelling, wherein the brightness of the ambient light around the motor vehicle is determined, the radiated light reflected from the road is captured, the measured values for the brightness of the ambient light and the radiated light reflected from the road are included in the calculation of the road surface temperature, and with a sensor arrangement for a motor vehicle for determining the surface temperature of the road on which a motor vehicle is travelling, wherein at least one light sensor is assigned to the sensor arrangement for capturing the brightness of the ambient light around the motor vehicle, and at least one light sensor is assigned to the sensor arrangement for capturing the radiated light reflected from the road on which a motor vehicle is travelling. Further developments and advantageous variants are described in the subordinate claims.

In a method for determining the surface temperature of a road on which a motor vehicle is travelling, it is provided as essential to the invention that the brightness of the ambient light around the motor vehicle is determined, that radiated light reflected from the road is captured, and that the measured values for brightness of the ambient light and the radiated light reflected from the road are included in the calculation of the road surface temperature.

Sensor devices installed in the vehicle are used to determine the surface temperature of the road on which the motor vehicle is travelling. The brightness of the ambient light around the motor vehicle is captured by means of a sensor device installed in the vehicle, in particular a light sensor. For example, the brightness of the ambient light may be captured by means of a light sensor which is arranged in the motor vehicle, close to the foot of the rear view mirror behind the windscreen. The radiated light reflected from the road is also captured by means of a radiated light sensor, for example, in particular a light sensor, and included in the calculation of the road surface temperature. For example, the sensors may be the light sensors installed in a rain-light-sensor unit which is already provided in the vehicle. The radiated light reflected from the road may be infrared radiated light, for example, so that information about the temperature of the road surface may be obtained thereby. The surface temperature of the road is calculated from the measured values for the brightness of the ambient light and measured values for the radiated light reflected from the road.

The input variables may be stored for example in an input vector (v) for evaluation. Signal processing for determining the road temperature is a multistage process. In this context, a first step may consist in applying a generalised polynomial function $f_1$ to the input vector. The result $f_1(v)$ is a first approximation of the road temperature. Then, some of the input variables may be considered for a case differentiation. For example, a differentiation may be made between bright and dark conditions in the ambient light using a threshold value. Classes between which a differentiation is to be made are produced from this and other Either-Or decisions. The input vector of a further generalised polynomial function which is assigned to class is transferred in accordance with these classes or the current conditions, resulting in a further approximation of the road temperature. For example, these approximated road temperatures may now be transferred together with the input vector to a machine-trained algorithm, the result of which serves to determine the road temperature.

In a further development of the method, the ambient temperature of the vehicle is captured, and the ambient temperature is included in the calculation of the road surface temperature. In order to determine the road surface temperature, the ambient temperature around the motor vehicle is captured by means of a temperature measuring device, for example some kind of thermometer, thermocouple or something like that, installed in the vehicle. This may be arranged close to the air intake for the radiator, for example. The ambient temperature around the motor vehicle is used in the calculation of the road surface temperature. For example, a differentiation may be made between cold and warm conditions on the basis of a threshold value of the ambient temperature, wherein this differentiation is included in the division of the classes.

In a further development of the method, the ambient brightness is captured by means of a light sensor which is directed towards the sky, wherein the light sensor has an unobstructed optical pathway to the sky. The capture of ambient brightness by means of a light sensor directed towards the sky enables the ambient brightness to be captured with particular precision, since the incident light is not affected by shadowing or the like. The light sensor might include a photodiode or something similar. In particular, an unobstructed optical path between the light sensor and the sky is provided for this purpose, thus the light sensor is directed towards the sky without the imposition of shadowing effects caused by parts of the vehicle bodywork, for example. This manner of ambient brightness capture enables particularly precise determination of the road surface temperature.

In a further development of the invention, the brightness of the light falling on the windscreen of the motor vehicle is captured in order to determine ambient brightness. The ambient brightness around the motor vehicle is captured by detecting the light that falls on an area of the windscreen. In particular, the light sensor for capturing the ambient brightness may be arranged close to the foot of a rear view mirror disposed on the inside of the windscreen. The light sensor may belong to a rain-light sensor of the vehicle. The light sensor has an unobstructed optical pathway upwards, that is to say an unobstructed field of view for the sensor for capturing the brightness of the ambient light. Ambient brightness is a major influencing factor on road surface temperature, so capturing the ambient temperature makes it possible to determine the road surface temperature with greater precision.

In a further development of the invention, the infrared light component of the radiated light reflected from the road is captured, the infrared light component of the radiated light falling on the windscreen is captured, and the infrared light components are included in the calculation of the road surface temperature. The infrared components, that is to say the infrared light components, in particular the radiated light intensity of the radiated light reflected from the road and the infrared component of the radiated light falling on the motor vehicle windscreen are captured. In particular, these may be the infrared components of the ambient light falling on the windscreen and the infrared components of the radiated light reflected from the road. The infrared light components which fall on the road surface contribute significantly to the warming of the road surface, so capturing the infrared components of the radiated light, in particular the infrared light components, enables the road surface temperature to be predicted more precisely.

In a further development of the invention, the infrared light component of the radiated light falling on the driver's side and the front passenger's side of the windscreen is captured. The radiated light which falls on the windscreen, that is to say the motor vehicle windscreen is captured via the light sensors. In this process, the radiated light falling on the driver's side and the front passenger's side of the windscreen are captured separately. By capturing the infrared radiated light falling on the two sides of the vehicle separately, it is possible to arrive at a more precise calculation of the road surface temperature, for different areas of the road, for example.

In a further development of the method, moisture on the road is captured, and at least one measured value for the detected moisture is included in the calculation of the road surface temperature. Another parameter with significant influence on the road surface temperature is the liquid or moisture which may be present on the road, as a result of precipitation, for example. The degree to which the road is currently covered with moisture may be captured via sensor devices installed in the vehicle and may be included in the calculation of the road surface temperature. For example moisture can be detected via moisture droplets thrown up from the roadway by the vehicle's tyres striking against a structure borne sound sensor. In addition, the evaporation rate of the moisture on the road may be estimated from the road surface temperature, thereby enabling a more precise estimate of the amount of water remaining on the road. In addition, information about the current precipitation situation, that is to say for example the quantity of precipitation falling on the motor vehicle may also be included in the calculation. A division into dry and wet conditions may be made on the basis of the captured road wetness and/or the current precipitation conditions. The input variables, that is to say the reflectivity of the road in front of the motor vehicle, the ambient brightness, the intensity of the sunlight incident on the windscreen, falling rain and the wetness of the road are stored in an input vector (v). A generalised polynomial function $f_1$ is applied to the input vector. The result $f_1(v)$ is a first approximation of the road temperature. Then, input variables may be considered in order to establish a case differentiation. For example, a differentiation between bright and dark conditions may be made on the basis of a threshold value in the ambient light, and a differentiation between cold and warm conditions may be made on the basis of a threshold value in the ambient temperature. A differentiation may also be made between dry and wet conditions. Thus, eight differentiated classes can be created from these three Either-Or decisions. On the basis of these classes, or the current conditions, the input vector for one of eight further generalised polynomial functions ($f_2$ to $f_9$) is transferred, thereby resulting in a further approximation of the road temperature $f_{1+n}(v)$, $1 \leq n \leq 9$. These first two approximated road temperatures can now be transferred together with the input vector as features to a machine-trained algorithm A for regression or classification, the result of which $A[f_1(v), f_{1+n}(v), v] \approx T_{Road}$, $1 \leq n \leq 9$ is used to determine the road temperature.

In a further development of the method, measured values of the ambient conditions in the motor vehicle's environment are stored in an input vector, a polynomial function is applied to the input vector, and a first approximation of the road surface temperature is calculated from the polynomial function. Measured values for the ambient conditions around the motor vehicle are transferred to an input vector as input data. Measured values for the ambient conditions may be for example the brightness of the ambient light around the motor vehicle, the radiated light reflected from the road, the ambient temperature around the motor vehicle, the intensity of the sunlight falling on the windscreen, the quantity of precipitation falling on the motor vehicle, and the wetness of the road. A generalised polynomial function $f_1$ is applied to the input vector. A first approximation of the road surface temperature may be calculated with the polynomial function $f_1(v)$.

In a further development of the method, various classes of ambient conditions are determined from the measured values for the ambient conditions, a polynomial function is assigned to each class, at least one of these polynomial functions is applied to the input vector, and a further approximation of the road surface temperature is calculated with the polynomial function. Ambient condition classes may be calculated from the measured values for the ambient conditions, i.e. from the input variables, using various case differentiations. For example a differentiation may be made between bright and dark conditions with the aid of a threshold value in the ambient light, and a differentiation may be made between cold and warm conditions with the aid of a threshold value in the ambient temperature. A differentiation may be made between dry and wet conditions, for example, with the aid of a measured value for road moisture. For example, eight ambient condition classes for differentiation result from these three Either-Or decisions. A polynomial function $f_2$ to $f_9$ may be assigned to each ambient condition class. The input vector is transferred to one of the eight further general polynomial functions ($f_2$ to $f_9$) on the basis of these classes, i.e., the current ambient conditions. The calculation of the selected polynomial function returns a further approximation of the road surface temperature.

In a further development of the invention, a relationship between the ambient temperature, the measured values for the brightness of the ambient light, the measured values for the infrared light components and the road surface temperature is determined in advance, wherein the measured values for the ambient temperature, the measured values for the brightness of the ambient light and the measured values for the infrared light components are captured on the vehicle, and the road surface temperature is captured in parallel via at least one external measuring device. In order to calculate a relationship between the road surface temperature and the measured values which can be captured on the vehicle, parallel measurements of the measured values that can be calculated in the vehicle and of the externally calculated road surface temperature are registered in advance. The measured values that can be calculated in the vehicle may be for example the ambient brightness, the measured values for infrared radiated light and measured values for the ambient temperature. In particular, these measurements may be carried out before serial production of a vehicle model begins. A relationship can be calculated from the measured values recorded in the vehicle and the road surface temperature determined for example by an external measuring device. This makes it possible to calculate the road surface temperature using the measured values captured in the vehicle. The relationship may be a formular relationship for example. The calculated relationship may be stored in an evaluation device in the motor vehicle, for example. The evaluation device may be a board computer, a processor or something similar.

In a further development of the method, the relationship is determined via an artificial neural network and/or a nearest neighbour classification and/or by machine learning methods. An artificial neural network and/or nearest neighbour classification and/or machine learning methods for example may be applied to determine a relationship between the measured values captured on the vehicle and the externally detected road surface temperature. By these methods, an algorithm may be found, for example with which the measured values captured on the vehicle may be converted into the surface temperature of the road. The algorithm may be stored in an evaluation device in the motor vehicle.

A further aspect of the invention relates to a sensor arrangement for a motor vehicle for determining the surface temperature of a road on which the motor vehicle is travelling, in particular to carry out the method according to the invention, in which it is provided as essential to the invention that at least one light sensor is assigned to the sensor arrangement for capturing the brightness of the ambient light around the motor vehicle, and that at least one light sensor is assigned to the sensor arrangement for capturing the radiated light reflected from the road on which the vehicle is travelling.

In order to determine the road surface temperature, the sensor arrangement has at least one light sensor with at last one unobstructed optical pathway to the road on which the motor vehicle is travelling. In particular, the light sensor may be arranged to face the road. The unobstructed pathway to the road makes it possible to capture radiated light, in particular infrared radiated light which is reflected from the road. In addition, a light sensor is assigned to the sensor arrangement for determining the ambient brightness. A calculation of the surface temperature of the road on which the motor vehicle is travelling from the measured values for the ambient temperature, the ambient brightness and the infrared radiated light reflected from the road is made possible. For this purpose, the sensor devices may be connected to an evaluation device in such a way as to be able to pass data, wherein an algorithm for calculating the road surface temperature from the measured values is stored in the evaluation device. The evaluation device may be a board computer of the vehicle, a processor unit or something like that.

In a further development of the invention, at least one temperature sensor for determining the ambient temperature around the vehicle is assigned to the sensor arrangement. For determining the road surface temperature, the sensor arrangement has at least one temperature sensor which is designed to determine the ambient temperature. The temperature sensor has at least one data-exchanging connection to evaluation device.

In a further development of the invention, at least one light sensor is arranged facing the sky and the light sensor which faces towards the sky has an unobstructed optical pathway to the sky. The ambient light sensor is arranged facing towards the sky and has an unobstructed optical pathway to the sky. In this way, the ambient light around the motor vehicle is able to fall on the ambient light sensor unobstructed, thereby enabling an exact assessment of the road surface temperature. The light sensor may be a photodiode or something similar.

In a further development of the invention, at least one light sensor is designed to capture infrared radiated light. The light sensors for capturing ambient light and the light sensors for capturing the radiated light reflected from the road are designed to capture infrared radiated light. The light sensor may be a photodiode or something similar. Capturing the infrared components of radiated light falling on the motor vehicle and/or the radiated light reflected from the road enables a more precise calculation of the road surface temperature.

In a further development of the invention, a light sensor is assigned to the driver's side of the motor vehicle and a light sensor light sensor is assigned to the front passenger's side of the motor vehicle. One light sensor, in particular a brightness sensor designed to capture ambient brightness, that is to say the ambient brightness around the motor vehicle, is assigned to the driver's side of the motor vehicle, while another brightness sensor is designed to capture the ambient brightness on the front passenger's side of the motor vehicle. The light sensors may be a photodiode or something similar. Local resolution of the of the ambient brightness for the driver's side and passenger's side of the motor vehicle enables a more precise prediction of the road surface temperature.

In a further development of the invention, at least one moisture sensor is assigned to the sensor arrangement for detecting moisture on the road. A moisture sensor is assigned to the sensor arrangement for detecting moisture on the road. These may be for example sensor devices arranged inside the wheel arches in the motor vehicle. For example moisture droplets thrown up by the tyres from the roadway can be detected with a structure borne sound sensor. Detecting the moisture on the road on which the motor vehicle is travelling enables a more precise prediction of the road surface temperature, since the road surface temperature is affected very significantly by the moisture on the road. The moisture sensor may have a connection allowing data exchange with the evaluation device for evaluating the measured values.

In a further development of the invention, the light sensors of the sensor arrangement are arranged on the side of the windscreen in the interior of the motor vehicle, and the light sensor are arranged in a region of the windscreen which is swept by at least one windscreen wiper. The light sensors of the sensor arrangement, for example the photodiodes, are arranged on the inside of the motor vehicle windscreen. In order to ensure uninterrupted capture of the ambient light conditions, the light sensors are arranged in a position on the windscreen which is swept by at least one windscreen wiper. In this way, the ambient light conditions can still be captured precisely even when the windscreen is exposed to precipitation or dirt.

In a further development of the invention, the light sensor are arranged close to the foot of a rear view mirror arranged on the inside of the windscreen. The sensor devices, for example the photodiodes, for capturing brightness and the infrared radiated light reflected from the road may be arranged close to the to the foot of a rear view mirror arranged on the inside of the windscreen. This ensures simple fitting and a space-saving arrangement.

Furthermore the invention relates to a vehicle, in particular a motor vehicle with a sensor arrangement according to the invention.

BRIEF DESCRIPTION OF THE DRAWINGS

In the following text, the invention will be explained further with reference to an exemplary embodiment represented in the drawing. Specifically, the diagrammatic representations show.

DETAILED DESCRIPTION OF THE INVENTION

Figure 1:
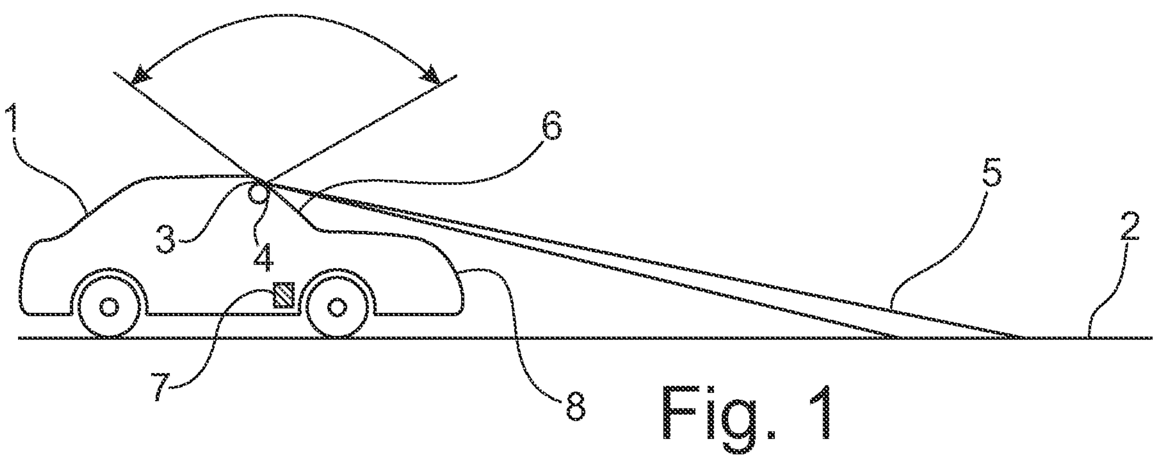
FIG. 1: a motor vehicle on a road with a sensor arrangement for capturing the road surface temperature.

FIG. 1 shows a motor vehicle 1 which is travelling on a road 2. The motor vehicle 1 is equipped with a light sensor 3 for capturing ambient brightness, that is to say the intensity of the ambient light. The light sensor 3 is arranged to face towards the sky, so that there is an unobstructed optical pathway to the sky. The motor vehicle is further equipped with a light sensor 4 which is designed to capture the radiated light 5 reflected from the road 2. In particular, the light sensor 4 is designed to capture the infrared light component of the reflected radiated light 5. The light sensors 3 and 4 are arranged on the inside of the windscreen 6 of the motor vehicle 1 and might be photodiodes. The motor vehicle 1 is further equipped with at least one moisture sensor 7 for detecting the moisture present on the road 2. The moisture sensor 7 may be a structure borne sound sensor, detecting thrown up moisture droplets. An ambient temperature sensor 8 is arranged close to the air intakes of the radiator of the motor vehicle 1 to capture the ambient temperature around the motor vehicle 1. The arrangement of the light sensors 3, 4 and the moisture sensor 7 and the ambient temperature sensor 8 enables a determination of the road surface temperature of the road 2.

Figure 2:
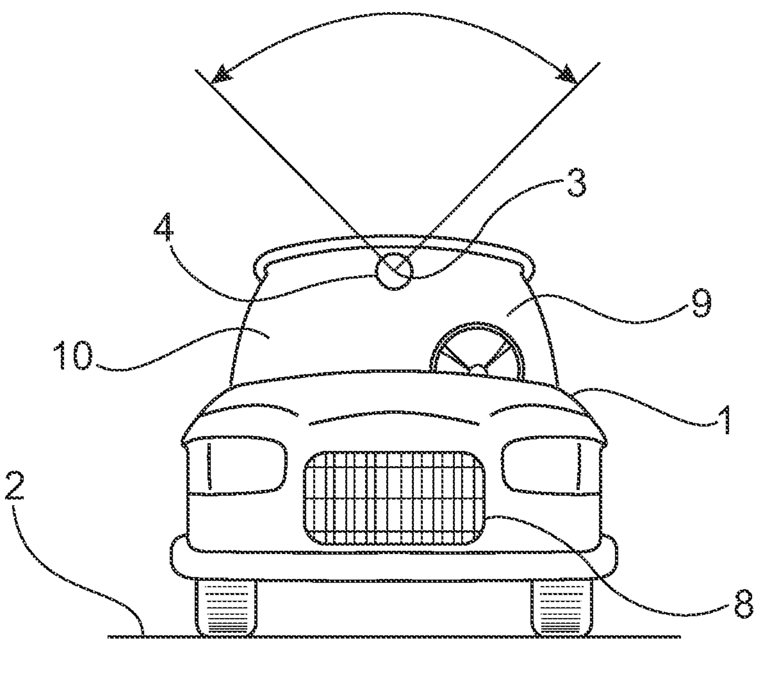
FIG. 2: a front view of a motor vehicle according to FIG. 1.

FIG. 2 represents a motor vehicle 1 according to FIG. 1. Identical components are denoted with the same reference numbers. The light sensor 3 is designed to capture the infrared radiated light falling in the driver's side 9 and the front passenger's side 10. This makes a spatially resolved capture of the infrared radiated light from the surroundings possible, thereby enabling a more precise calculation of the road surface temperature.

All of the features described in the preceding description, and those in the claims can be combined in any permutation with the features of the dependent claims. The disclosure of the invention is thus not limited to the feature combinations described and/or claimed herein, but rather all feature combinations which are practicable within the scope of the invention are to be deemed disclosed.

The invention claimed is:

1. A method for determining a surface temperature of a road on which a motor vehicle is travelling, the method comprising:

capturing a brightness of ambient light around the motor vehicle using a first light sensor toward the sky around the motor vehicle, the first light sensor having an unobstructed optical pathway to the sky, the first light sensor being installed in an interior of the vehicle;

capturing radiated light reflected from the road using a second light sensor, the second light sensor being installed in an interior of the vehicle;

calculating the surface temperature of the road using measured values for the brightness of the ambient light and the radiated light reflected from the road;

storing the measured values for ambient conditions of an environment around the motor vehicle in an input vector v;

applying a generalized polynomial function f1 to the input vector and calculating a first approximation of the surface temperature of the road f1(v) from the generalized polynomial function;

determining various classes of ambient conditions from the measured values for the ambient conditions;

assigning a polynomial function f2 to f9 to each of the classes;

applying at least one of these polynomial functions f2 to f9 to the input vector; and calculating a further approximation of the surface temperature of the road via one of the polynomial function f2 to f9, wherein a determination of the road surface temperature is enabled without external sensor devices.

2. The method according to claim 1, wherein an ambient temperature around the motor vehicle is captured, and the ambient temperature is included in said calculating the surface temperature of the road.

3. The method according to claim 1, wherein a brightness of light falling on a windscreen of the motor vehicle is captured in order to determine the ambient brightness.

4. The method according to claim 1, wherein an infrared light component of the radiated light reflected from the road is captured, and an infrared light component of light falling in a windscreen is captured, and the infrared light components are included in said calculating the surface temperature of the road.

5. The method according to claim 1, wherein an infrared light component of the radiated light falling on a driver's side and on a front passenger's side of the windscreen is captured.

6. The method according to claim 1, wherein moisture on the road is detected, and at least one measurand for the detected moisture is included in said calculating the surface temperature of the road.

7. The method according to claim 1, wherein a relationship between an ambient temperature, the measured values for the brightness of the ambient light, measured values for infrared light components and the surface temperature of the road is calculated in advance, and wherein the measured values for the ambient temperature, the measured values for the brightness of the ambient light and the measured values for the infrared light components are captured on the vehicle, and the surface temperature of the road is captured by means of at least one measuring device.

8. The method according to claim 7, wherein the relationship is determined by means of an artificial neural network and/or a nearest neighbor classification and/or machine learning methods.

9. A sensor arrangement for a motor vehicle for determining a surface temperature of the road on which a motor vehicle is travelling, the sensor arrangement comprising:

a first light sensor, arranged to face towards the sky, for capturing a brightness of ambient light around the motor vehicle, the first light sensor having an unobstructed optical pathway to the sky;

a second light sensor for capturing radiated light reflected from the road on which a motor vehicle is traveling;

a third light sensor;

a temperature sensor installed at air intake for a radiator of the motor vehicle configured to capture an ambient temperature of the vehicle;

a moisture sensor configured to detect moisture on the road, wherein the surface temperature of the road is calculated using measured values for the brightness of the ambient light, the radiated light reflected from the road, the ambient temperature of the vehicle and the moisture on the road, wherein the first light sensor, the second light sensor and the third light sensor are arranged on a side of a windscreen, which is in an interior of the motor vehicle, wherein first light sensor, the second light sensor and the third light sensor are arranged in an area of the windscreen, which is swept by at least one windscreen wiper, wherein the surface temperature of the road is calculated by:

storing the measured values for ambient conditions of an environment around the motor vehicle in an input vector v;

applying a generalized polynomial function f1 to the input vector and calculating a first approximation of the surface temperature of the road f1(v) from the generalized polynomial function;

determining various classes of ambient conditions from the measured values for the ambient conditions;

assigning a polynomial function f2 to f9 to each of the classes;

applying at least one of these polynomial functions f2 to f9 to the input vector; and calculating a further approximation of the surface temperature of the road via one of the polynomial function f2 to f9, and wherein a determination of the road surface temperature is enabled without external sensor devices.

10. The sensor arrangement according to claim 9, wherein the first light sensor is designed to capture infrared radiated light.

11. The sensor arrangement according to claim 9, wherein the third light sensor is arranged on a front passenger's side of the motor vehicle, and wherein the first light sensor is arranged on a driver's side of the motor vehicle.

12. A motor vehicle equipped with a sensor arrangement according to claim 9.

13. A method for determining a surface temperature of a road on which a motor vehicle is travelling, the method comprising:

capturing a brightness of ambient light around the motor vehicle using a first light sensor toward the sky around the motor vehicle, the first light sensor having an unobstructed optical pathway to the sky;

capturing radiated light reflected from the road using a second light sensor;

calculating the surface temperature of the road using measured values for the brightness of the ambient light and the radiated light reflected from the road;

storing the measured values for ambient conditions of an environment around the motor vehicle are in an input vector v;

applying a generalized polynomial function f1 to the input vector and calculating a first approximation of the surface temperature of the road f1(v) from the generalized polynomial function;

determining various classes of ambient conditions from the measured values for the ambient conditions;

making a differentiation between bright and dark conditions on the basis of a threshold value in the ambient light;

making a differentiation between cold and warm conditions on the basis of a threshold value in the ambient temperature;

making a differentiation between dry and wet conditions;

assigning one polynomial function f2 to f9 to each of these differentiated classes created from these three differentiations;

applying at least one of the polynomial functions f2 to f9 to the input vector; and calculating a further approximation of the surface temperature of the road via one the polynomial function f2 to f9, wherein a determination of the road surface temperature is enabled without external sensor devices.

* * * * *